US012100377B2

(12) United States Patent
Moriyama et al.

(10) Patent No.: US 12,100,377 B2
(45) Date of Patent: Sep. 24, 2024

(54) PEDAL BOARD AND METHOD OF ATTACHING EFFECTOR TO PEDAL BOARD

(71) Applicant: Roland Corporation, Shizuoka (JP)

(72) Inventors: Yasushi Moriyama, Shizuoka (JP); Shuichi Nakagawa, Shizuoka (JP)

(73) Assignee: Roland Corporation, Shizuoka (JP)

( * ) Notice: Subject to any disclaimer, the term of this patent is extended or adjusted under 35 U.S.C. 154(b) by 399 days.

(21) Appl. No.: 17/558,536

(22) Filed: Dec. 21, 2021

(65) Prior Publication Data

US 2022/0208162 A1 Jun. 30, 2022

(30) Foreign Application Priority Data

Dec. 25, 2020 (JP) ................................ 2020-217604

(51) Int. Cl.
*G10H 1/34* (2006.01)

(52) U.S. Cl.
CPC ....... *G10H 1/348* (2013.01); *G10H 2230/371* (2013.01)

(58) Field of Classification Search
CPC ......................... G10H 1/348; G10H 2230/371
See application file for complete search history.

(56) References Cited

U.S. PATENT DOCUMENTS

| | | | | |
|---|---|---|---|---|
| 6,215,055 | B1 * | 4/2001 | Saravis | G10H 1/348 84/746 |
| 2020/0388260 | A1 * | 12/2020 | Chickneas | H04H 60/04 |

OTHER PUBLICATIONS

Boss Corporation, "Pedal Board BCB-60 Owners Manual," Jul. 2003, Available at: https://www.boss.info/us/products/bcb-60/support/.

* cited by examiner

*Primary Examiner* — Kimberly R Lockett
(74) *Attorney, Agent, or Firm* — JCIPRNET

(57) ABSTRACT

A pedal board includes an attached member and a plate. The attached member includes an attached surface on which an effect device is arranged, and at least one accommodation part formed on the attached surface as a recess capable of accommodating a wiring connected to the effect device. The plate has elasticity, formed with an opening and placed on an attached surface side of the attached member, wherein the effect device is fittable into the opening.

19 Claims, 8 Drawing Sheets

PEDAL BOARD AND METHOD OF ATTACHING EFFECTOR TO PEDAL BOARD

CROSS-REFERENCE TO RELATED APPLICATION

This application claims the priority benefit of Japan application serial no. 2020-217604, filed on Dec. 25, 2020. The entirety of the above-mentioned patent application is hereby incorporated by reference herein and made a part of this specification.

BACKGROUND

Technical Field

The disclosure relates to a pedal board and a method of attaching an effector to a pedal board, and more particularly, to a pedal board and a method of attaching an effector to a pedal board capable of suppressing exposure of a wiring while securing a degree of freedom in a position of attaching an effector.

Related Art

A pedal board to which a plurality of effectors (effect devices) can be attached has been disclosed. For example, Non-Patent Document 1 (Instruction manual for pedal board (BCB-60) manufactured by Roland Corporation) discloses a product configured in the following manner. An effector case is formed of a front case and a rear case, and effectors are attached to the rear case. By removing the front case, the effectors are exposed and a pedal board is formed; on the other hand, by attaching the front case to the rear case, it becomes a case for carrying the effectors. According to this product, the effectors may be attached to free positions on the rear case.

However, in the conventional pedal board described above, since the wiring is exposed, if the effectors are attached to free positions, the routing of the wiring becomes messy and the look may become undesirable. Further, in such a state, the wiring may be pinched and damaged by the operated effector, or the wiring may come into contact with an operator of the effector and thus change a set value.

SUMMARY

A pedal board according to an embodiment of the disclosure includes an attached member and a plate. The attached member includes an attached surface to which an effect device is attached, and at least one accommodation part formed on the attached surface as a recess capable of accommodating a wiring connected to the effect device. The plate has elasticity and is formed with an opening and placed on an attached surface side of the attached member. The effect device is fittable into the opening.

A method of attaching an effector to a pedal board according to an embodiment of the disclosure includes the following steps. An attached member which is a main body part of a case is provided, the attached member including an attached surface which is at least one region having a substantially same height, and at least one accommodation part having a height less than a height of the attached surface. A plate having elasticity is placed on the attached surface of the attached member, and the plate is formed with an opening. A wiring to be connected to the effector is routed around a rear side of the plate and arranged in the accommodation part of the attached member. The effector is fitted into the opening and the wiring is connected to the effector.

DESCRIPTION OF THE EMBODIMENTS

Embodiments of the disclosure provide a pedal board capable of suppressing exposure of a wiring while securing a degree of freedom in a position of attaching an effector.

Figure 1A:
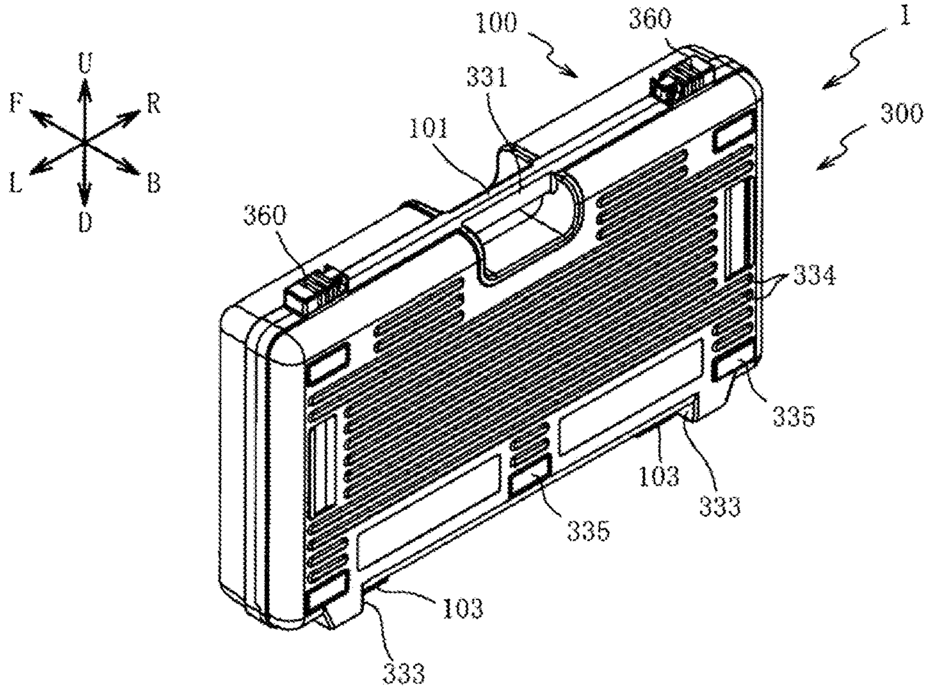
FIG. 1(*a*) is a rear perspective view of an effector case according to a first embodiment, and FIG. 1(*b*) is a perspective view of the effector case in an open state.
Figure 1B:
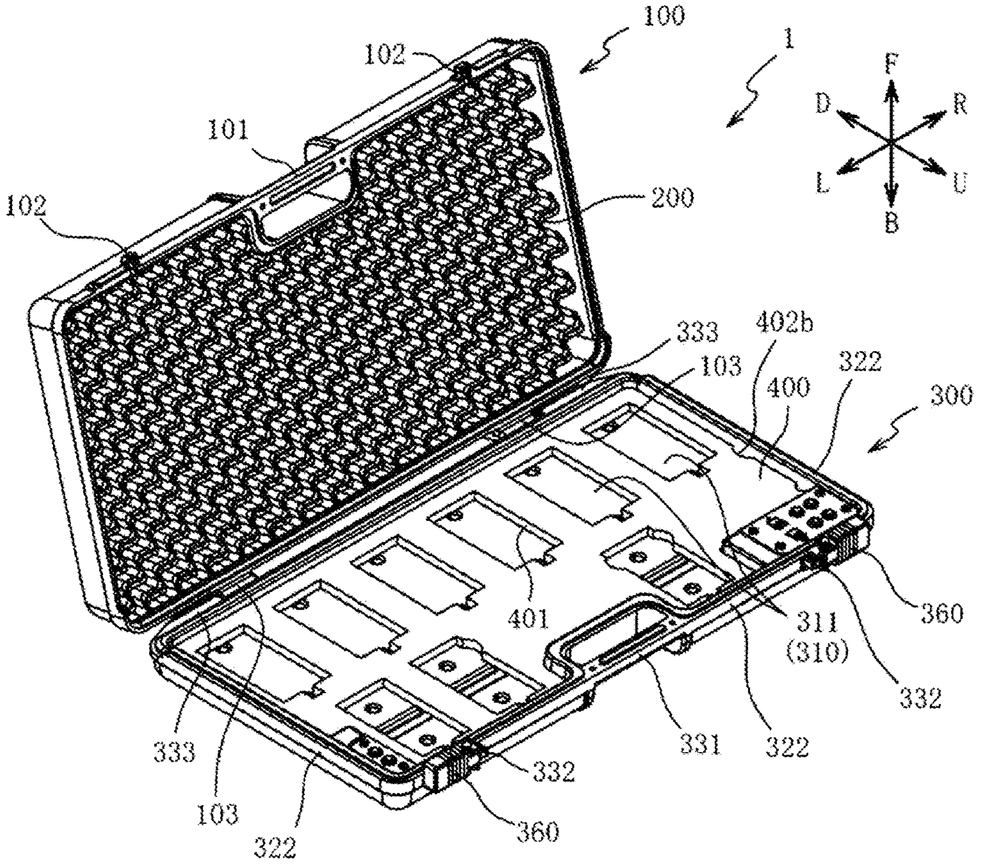
Figure 2:
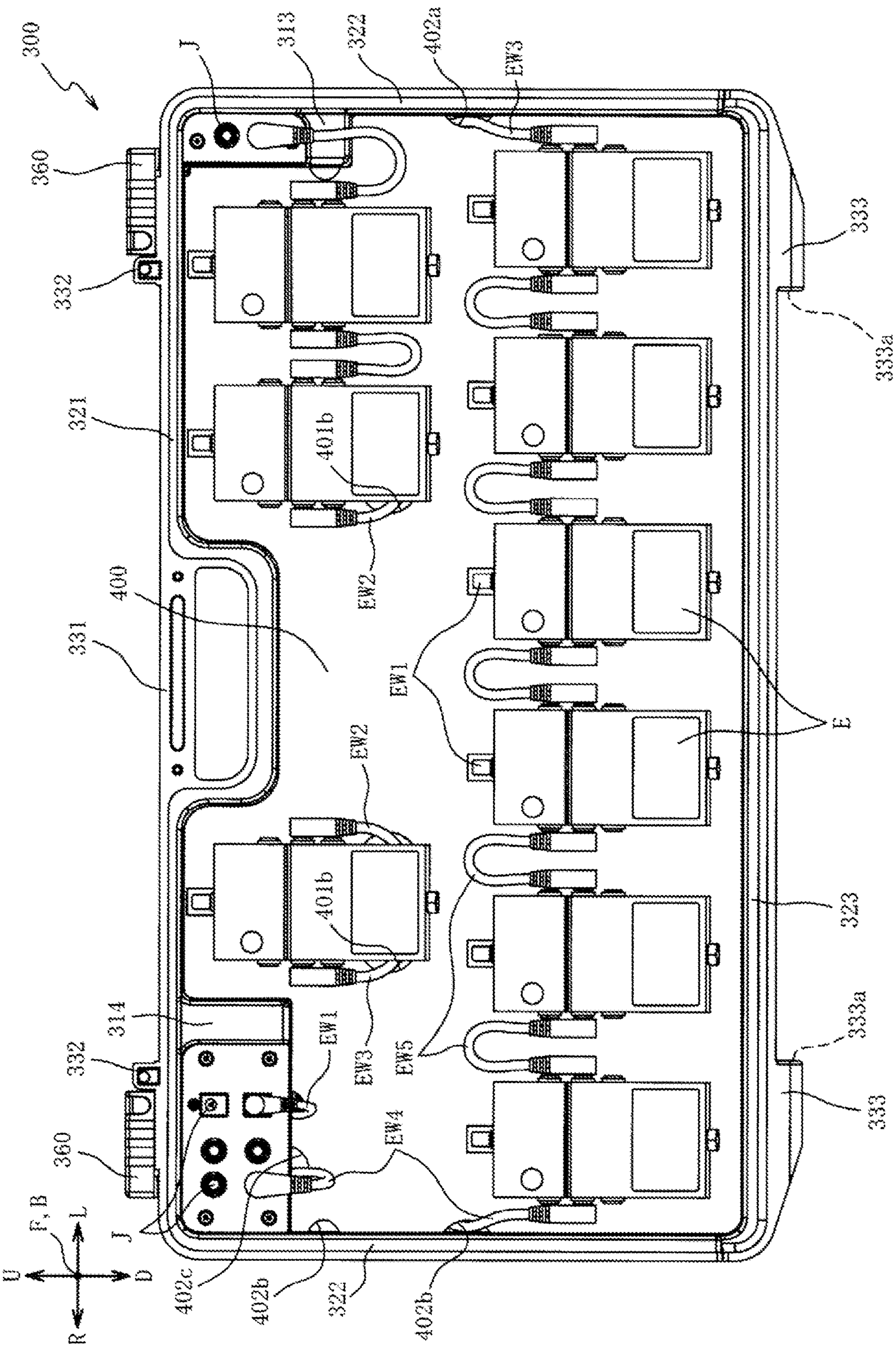
FIG. 2 is a front view of a rear case and a cushion.

Hereinafter, exemplary embodiments will be described with reference to the accompanying drawings. First, an overall configuration of an effector case 1 will be described with reference to FIG. 1(*a*), FIG. 1(*b*), and FIG. 2. FIG. 1(*a*) is a rear perspective view of the effector case 1 according to a first embodiment, and FIG. 1(*b*) is a perspective view of the effector case 1 in an open state. FIG. 2 is a front view of a rear case 300 and a cushion 400.

Surfaces facing an arrow F direction, an arrow B direction, an arrow U direction, an arrow D direction, an arrow L direction, and an arrow R direction in FIG. 1(*a*), FIG. 1(*b*), and FIG. 2 are defined as a front surface, a rear surface, an upper surface, a lower surface, a left surface, and a right surface of the rear case 300. The same applies to FIG. 3 and subsequent figures.

As shown in FIG. 1(*a*), FIG. 1(*b*), and FIG. 2, the effector case 1 includes a front case 100, a buffer pad 200 attached to the front case 100, a rear case 300 having an attached surface 311 on which an effector E (an effect device, not shown in FIG. 1(*b*)) is arranged, and a cushion 400 attached to the rear case 300, and the effector case 1 is formed in a rectangular parallelepiped shape in a closed state.

With the front case 100 attached to the rear case 300 (bringing to the closed state), the effector case 1 may be used as a portable case with the effector E stored therein (see FIG. 1(*a*)), and with the front case 100 removed from the rear case 300, the rear case 300 may be used as a pedal board (see FIG. 2).

When used as a pedal board, a part of wirings EW1 to EW4 is hidden by the cushion 400 to suppress their exposure. Accordingly, it is possible to improve the look, and it is also possible to prevent the wirings EW1 to EW4 from being pinched by the operated effector E or prevent the wirings EW1 to EW4 from coming into contact with an operator of the effector E.

In this embodiment, a part of each of the wiring EW1 for power supply, the wiring EW2 for connecting second and third stages in a connection row of the effectors E, the wiring EW3 for connecting third and fourth stages, and the wiring EW4 for connecting an end (ninth stage) to a jack J is hidden by the cushion 400.

The front case 100 is formed in a box shape of which a surface on one side (the surface facing the rear case 300 in the closed state) is opened, and is formed of ABS resin by hollow molding (blow molding). The front case 100 may also be formed of another resin material (e.g., polypropylene or polyethylene).

In the front case 100, a handle part 101, a pair of engaged parts 102, and a pair of hinge parts 103 are integrally formed. The handle part 101 and the engaged parts 102 are respectively formed at positions overlapping with a handle part 331 and engaged parts 332 of the rear case 300 when the effector case 1 is in the closed state, and the handle parts 101 and 331 serve as a handle for the effector case 1, and the engaged parts 102 and 332 serve as a portion with which a fixture 360 engages.

The fixture 360 is attached to the rear case 300 while being operable to a fixed position or a release position. By engaging the fixture 360, which is operated to the fixed position, with the engaged parts 102 and 332, the front case 100 is fixed to the rear case 300 (see FIG. 1(*a*)); by operating the fixture 360 to the release position, the engagement with the engaged parts 102 and 332 is released (see FIG. 1(*b*)).

A columnar shaft (not shown) is formed to protrude from the hinge part 103, and by inserting this shaft into a receiving part 333 (a shaft hole 333*a*) of the rear case 300, the front case 100 is rotatably supported by the rear case 300. While pressing one hinge part 103 against the receiving part 333, by moving another hinge part 103 in a direction orthogonal to the shaft, the shaft of the another hinge part 103 can be pulled out from the receiving part 333 (the shaft hole 333*a*), and the front case 100 can be removed from the rear case 300.

The buffer pad 200 is a sponge made of a soft urethane foam on which an uneven corrugated surface is formed. Herein, according to the effector case 1, since the front case 100 covers the front side of the rear case 300 (the attached surface 311), it is possible to prevent the wirings EW1 to EW5 (jack) from coming off the effectors E or prevent a set value of the operator from changing during carrying. In particular, in this embodiment, with the buffer pad 200 partially compressed and deformed by the height of the effector E, the effector E is restrained while being pressed against the rear case 300 (the attached surface 311). Accordingly, it is possible to prevent the effector E from colliding with the attached surface 311 and generating a noise during carrying.

Figure 3:
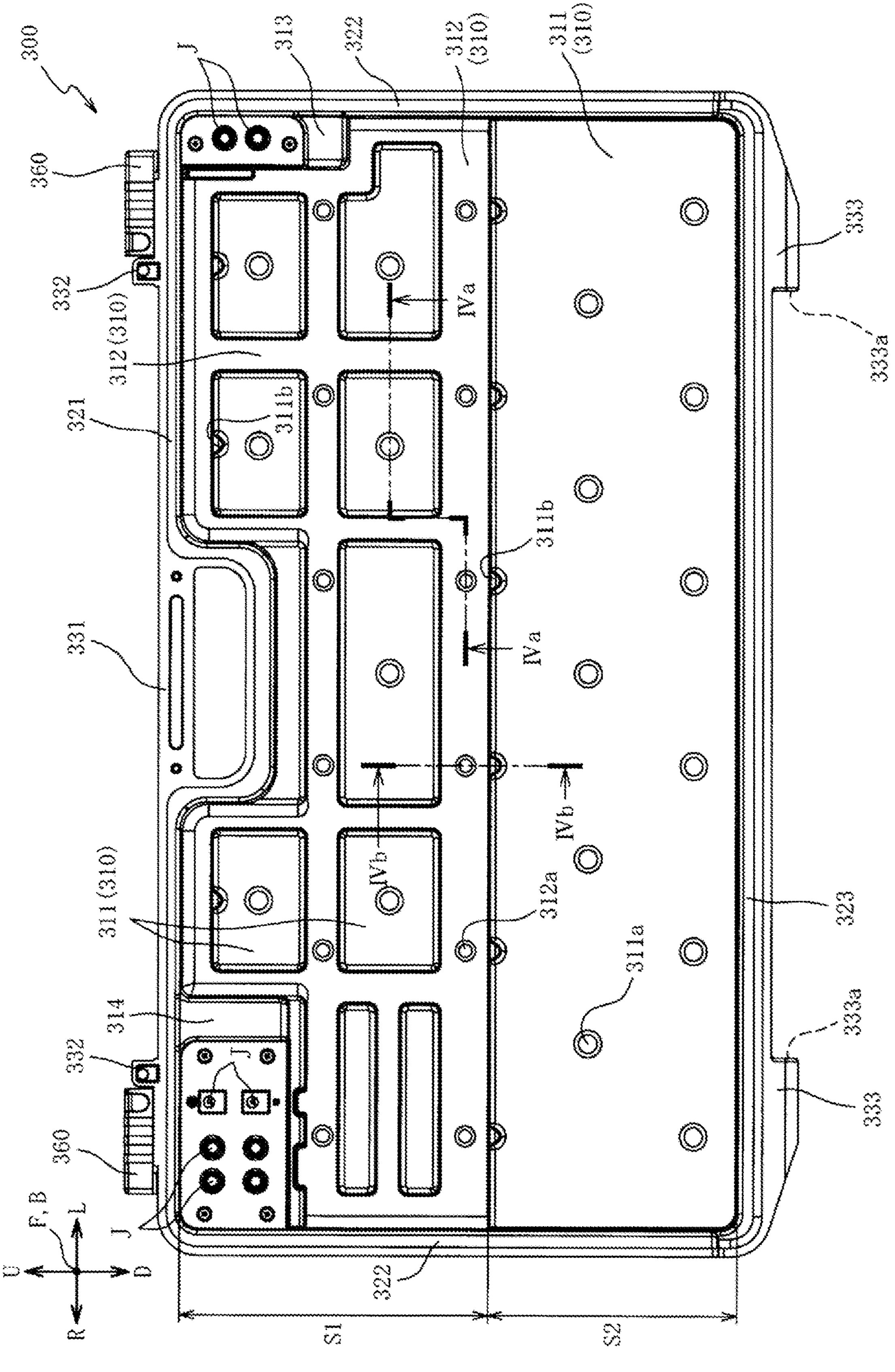
FIG. 3 is a front view of the rear case.
Figure 4A:
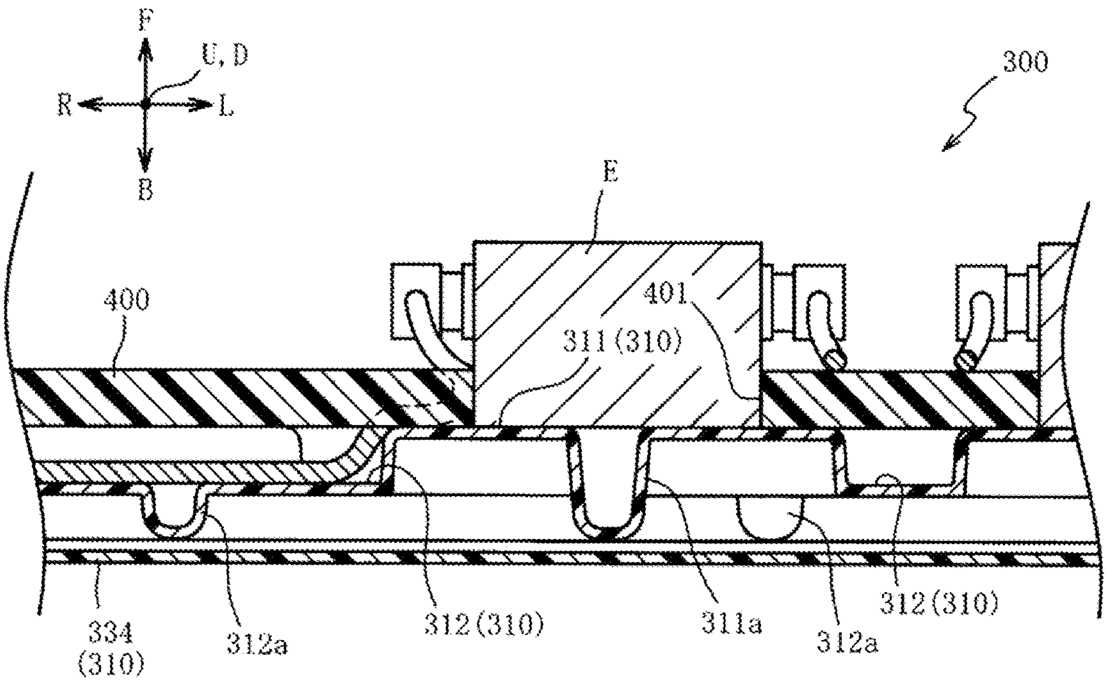
FIG. 4(*a*) is a partially enlarged cross-sectional view of the rear case cut along IVa-IVa line of FIG. 3, and FIG. 4(*b*) is a partially enlarged cross-sectional view of the rear case cut along IVb-IVb line of FIG. 3.
Figure 4B:
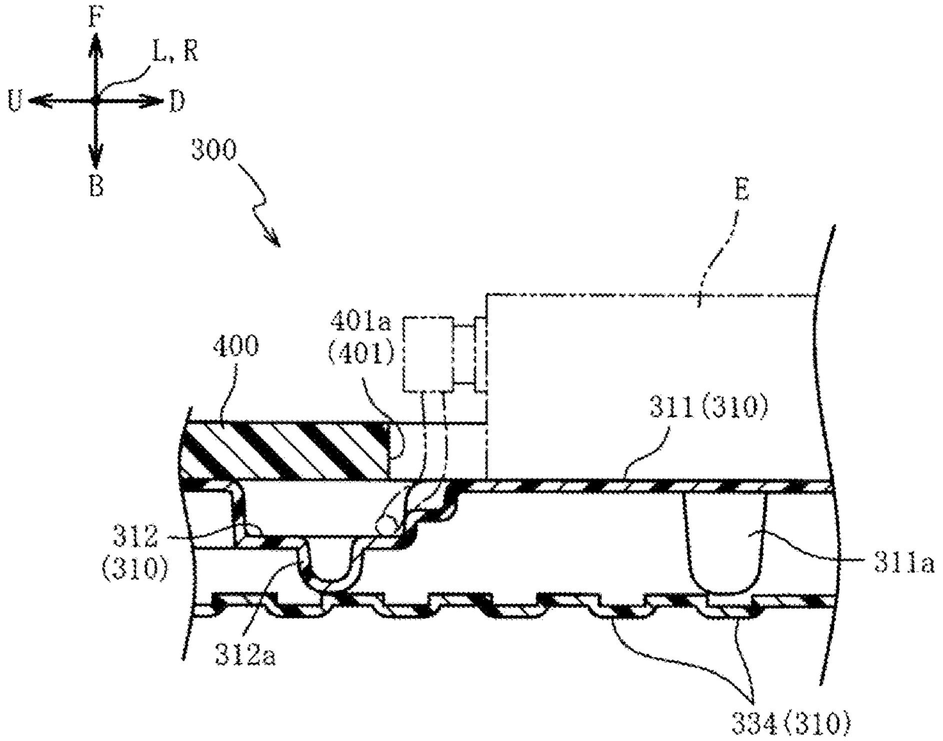

Next, the rear case 300 will be described with reference to FIG. 3, FIG. 4(*a*), and FIG. 4(*b*). FIG. 3 is a front view of the rear case 300. FIG. 4(*a*) is a partially enlarged cross-sectional view of the rear case 300 cut along IVa-IVa line of FIG. 3, and FIG. 4(*b*) is a partially enlarged cross-sectional view of the rear case 300 cut along IVb-IVb line of FIG. 3. In FIG. 4(*a*) and FIG. 4(*b*), a state in which the cushion 400 and the effector E are attached is shown. Further, in FIG. 4(*b*), the effector E is shown in a double dot-dashed line.

As shown in FIG. 3, FIG. 4(*a*), and FIG. 4(*b*), the rear case 300 is formed in a box shape of which a front surface (the surface on the arrow F direction side) is opened, and is formed of ABS resin by hollow molding (blow molding). Accordingly, it is possible to achieve both lightness and strength of the rear case 300. The rear case 300 may also be formed of another resin material (e.g., polypropylene or polyethylene).

Specifically, the rear case 300 includes a main body part 310 formed in a rectangular shape in a front view (plan view; arrow B direction view), wall parts 321, 322, and 323 formed along four edges (outer edges) of the main body part 310, a handle part 331, an engaged part 332, a receiving part 333, a rib 334, and a support part 335 (see FIG. 1(*a*)), and these parts are integrally formed.

The main body part 310 is a portion having a front surface (a surface on a paper surface side of FIG. 3) formed with an attached surface 311 on which the effector E is arranged and jack arrangement surfaces 313 and 314 on which the jack J is arranged. On the attached surface 311, a plurality of grooves 312 serving as accommodation spaces for the wirings EW1 to EW4 are formed to be recessed toward the rear side (arrow B direction side). The attached surface 311 is formed as a flat surface (a plane parallel to the arrow U-D direction and the arrow L-R direction) of which an overall height position (a position in the arrow F-B direction) is at the same position.

Herein, the front surface of the main body part 310 is divided into two parts, with a region on a handle part 331 side (wall part 321 side; arrow U direction side) being defined as a first region S1, and a region on a receiving part 333 side (wall part 323 side; arrow D direction side) being defined as a second region S2, respectively.

In the first region S1, a plurality of grooves 312 extending in the lateral direction (a direction along the wall parts 321 and 323; arrow L-R direction), a plurality of grooves 312 extending in the longitudinal direction (a direction along the wall part 322; arrow U-D direction) are formed, and these longitudinal and lateral grooves 312 intersect with each other. On the other hand, the grooves 312 are not formed in the second region S2.

Accordingly, in the first region S1, attached surfaces 311 surrounded by the grooves 312 and thus partitioned as substantially rectangular regions in a front view are formed at a plurality of positions (nine positions in this embodiment). On the other hand, the entire region of the second region S2 is the attached surface 311.

As described above, since the attached surfaces 311 are flat surfaces of which the height positions are at the same position as each other, and no level difference is generated between the attached surfaces 311, it is possible to suppress causing restrictions on the position at which the effector E is attached. For example, in the second region S2, the effector E may be attached to any position on the one attached surface 311, and in the first region S1, the effector E may be attached to any position while straddling two or more attached surfaces 311. Therefore, it is possible to secure a degree of freedom in the position at which the effector E is attached.

The effector E may also be attached to any position straddling the attached surface 311 in the first region S1 and the attached surface 311 in the second region S2.

The jack arrangement surfaces 313 and 314 are respectively formed at corner parts (intersections of the wall parts 321 and 322) in the first region S1, and are formed so that the jack J can be arranged at a position (a position on the paper surface side of FIG. 3) higher than the attached surface 311.

Accordingly, it is possible to arrange a wiring (not shown) that connects an external device and the jack J at a position far from the performer, and prevent the wiring from interfering with the operation on the effector E during performance. Further, even when the effector E is arranged adjacent to the jack arrangement surfaces 313 and 314, it is possible to easily insert and remove a plug into and from the jack J. Further, on the jack arrangement surfaces 313 and 314, since the groove 312 is formed at positions adjacent to a part of outer edges thereof, the wirings EW1 and EW4 connected to the jack J can be easily routed to the groove 312. Examples of the external device include musical instruments (guitars), AC power supplies, and amplifiers.

In the attached surfaces 311 and the grooves 312, support columns 311*a* and 312*a* are formed at a plurality of positions. The support columns 311*a* and 312*a* are formed in a hollow columnar shape by being recessed from the attached surfaces 311 and the grooves 312 toward the rear side (arrow B direction side), and a tip of the portion formed in the columnar shape can be brought into contact with an inner surface (a surface on the arrow F direction side) of a portion forming the rear side of the main body part 310 (a portion at which the rib 334 is formed).

Accordingly, when the effector E is stepped on and operated, since the support columns 311*a* and 312*a* serve as support columns and can support a portion on the front side of the main body part 310 (a portion at which the attached surface 311 and the groove 312 are formed), it is possible to prevent the attached surface 311 from bending toward the rear side. As a result, the operability of the effector E can be improved.

The support columns 311*a* in the first region S1 are formed at substantially central positions in a front view (arrow B direction view) of the attached surface 311, and the support columns 311*a* in the second region S2 are formed in a staggered arrangement to be dispersed over the attached surface 311. Further, the support columns 312*a* are formed in the grooves 312 extending in the lateral direction (a direction along the wall parts 321 and 323; arrow L-R direction).

Recesses 311*b* are formed at a plurality of positions on outer edges of the attached surfaces 311. The recesses 311*b* are portions formed by partially recessing a ridgeline portion between the attached surface 311 and a wall surface of the groove 312, and are formed approximately at a center in a width direction (arrow L-R direction) of the outer edge on the wall part 321 side of the attached surface 311 in the first region S1, and are formed at a plurality of positions (six positions in this embodiment) at substantially equal intervals along the outer edge on the wall part 321 side of the attached surface 311 in the second region S2.

Accordingly, when attaching (arranging) the effector E to the attached surface 311 of the rear case 300, the attaching position of the effector E can be determined by using the forming positions of the recesses 311*b* as marks (reference). Further, by attaching the effector E according to the forming positions of the recesses 311*b*, since the wiring EW1 connected to the front side of the effector E can be received in the recess 311*b*, the degree of freedom in routing the wiring EW1 can be improved (see FIG. 4(*b*)).

The rib 334 and the support part 335 (see FIG. 1(*a*)) are formed to project from the rear surface (a surface on the arrow B direction side) of the main body part 310. The rib 334 is a portion for increasing the rigidity of the main body part 310, and includes a plurality of strips extending along a length direction (arrow L-R direction) of the main body part 310. The support part 335 is a portion grounded to the floor when the rear case 300 is used as a pedal board, and is formed on the wall part 323 side in addition to four positions forming the corner parts of the main body part 310.

Next, the cushion 400 will be described with reference to FIG. 5(*a*) and FIG. 5(*b*) FIG. 5(*a*) is a front view of the cushion 400, and FIG. 5(*b*) is a partially enlarged cross-sectional view of the cushion 400 along Vb-Vb line of FIG. 5(*a*).

Figure 5A:
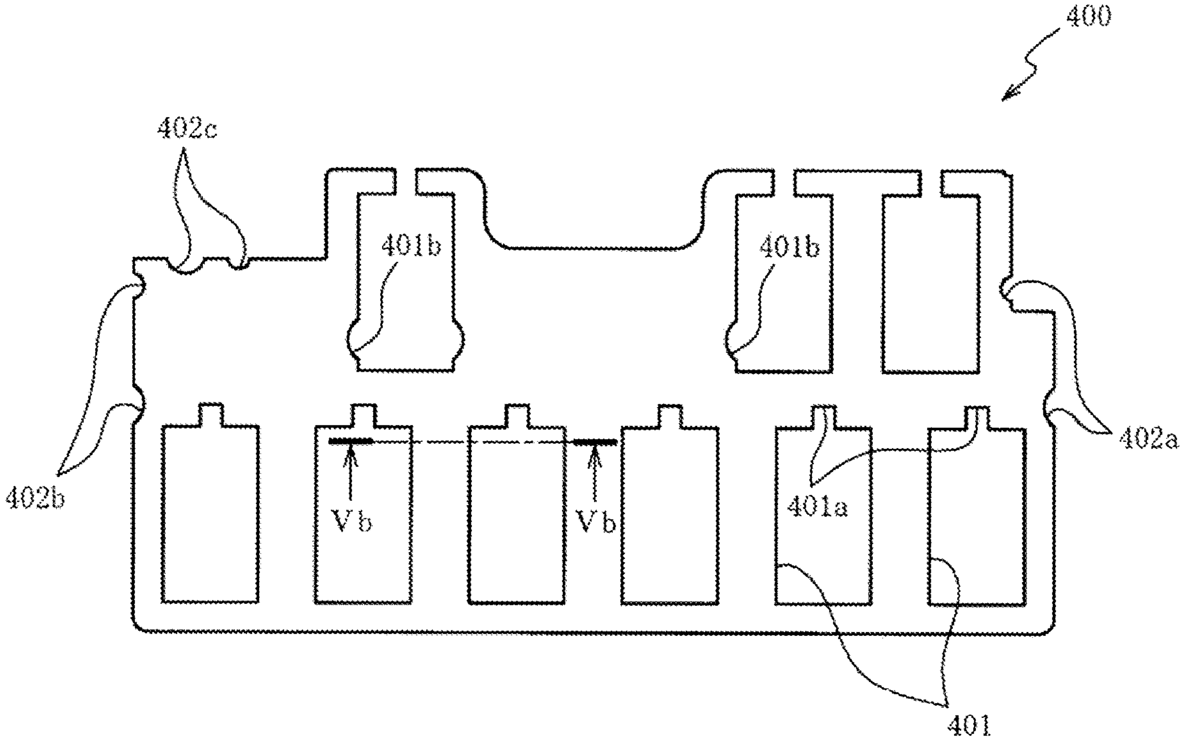
FIG. 5(*a*) is a front view of the cushion, and FIG. 5(*b*) is a partially enlarged cross-sectional view of the cushion along Vb-Vb line of FIG. 5(*a*).
Figure 5B:
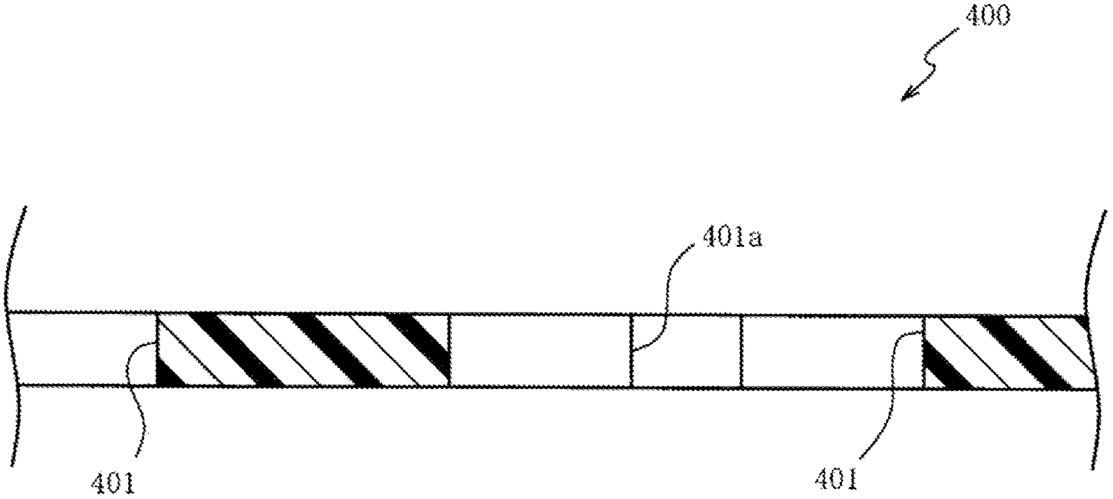

As shown in FIG. 5(*a*) and FIG. 5(*b*), the cushion 400 is a member for holding the effector E and hiding the wirings EW1 to EW4, is formed of a hard urethane foam as an elastic plate having a substantially constant thickness dimension, and is used by being placed on the attached surface 311 of the rear case 300 (see FIG. 3, FIG. 4(*a*), and FIG. 4(*b*)). The cushion 400 may also be formed of another material (e.g., foamed polyethylene, chip urethane, and rubber sponge).

The shape (outer shape) of the cushion 400 in a front view (plan view; arrow B direction view) is formed in a substantially same shape (or a slightly larger shape) as a front-view shape of a region (i.e., the region formed by the attached surfaces 311 and the grooves 312) excluding the jack arrangement surfaces 313 and 314 in the main body part 310 of the rear case 300 (see FIG. 2). Therefore, the cushion 400 placed on the attached surface 311 is restrained by inner surfaces of the wall parts 321 to 323 and wall surfaces of the jack arrangement surfaces 313 and 314, and movement in the horizontal direction (a direction parallel to the attached surface 311) is restricted.

The cushion 400 is formed with openings 401 and notches 402*a* to 402*c* respectively at a plurality of positions. The opening 401 is formed as an opening having a substantially same shape (or a slightly smaller shape) as the outer shape of the effector E. Therefore, the effector E fitted into the opening 401 is restrained by an inner surface of the opening 401, and movement in the horizontal direction (a direction parallel to the attached surface 311) is restricted (see FIG. 3 and FIG. 4(*a*)).

Accordingly, the effector E is held in a state of being attached to the attached surface 311. Therefore, it is not necessary to fix the effector E to the attached surface 311 with a hook-and-loop fastener or a double-sided tape. As a result, operability when attaching and detaching the effector E can be improved. Similarly, the cushion 400 is also held in a state of being attached to the rear case 300 and is not required to be fixed to the attached surface 311 with a hook-and-loop fastener or a double-sided tape. As a result, operability when attaching and detaching the cushion 400 can be improved.

Notches 401*a* and 401*b* are formed on an inner edge of the opening 401, and a space (gap) is formed with respect to an outer surface of the effector E (see FIG. 2 and FIG. 4(*b*)). Similarly, notches 402*a* to 402*c* are formed on an outer edge of the cushion 400, and a space (gap) is formed with respect to inner surfaces of the wall parts 321 to 323 or wall surfaces of the jack arrangement surfaces 313 and 314 (see FIG. 2). Accordingly, it is easier to route the wirings EW1 to EW4 between the front side and the rear side of the cushion 400.

The notches 402*a* to 402*c* are formed at positions overlapping with the grooves 312 of the rear case 300 in a front view (arrow B direction view) when the cushion 400 is placed on the attached surface 311 of the rear case 300 (see FIG. 2 and FIG. 3). Accordingly, it is easier to route the wirings EW1 to EW4 from the front side of the cushion 400 to the grooves 312 (or in an opposite direction), and when taking out the cushion 400 placed on the attached surface 311 of the rear case 300, fingers inserted through the notches 402*a* to 402*c* can be easily turned to the rear surface of the cushion 400 by utilizing the space of the grooves 312.

The number, position, and shape of the openings 401 (the notches 401*a* and 401*b*) may be appropriately set according to a use mode such as the number, shape, and layout of the effectors E to be used. In other words, in this embodiment, in an initial state (sales state), the cushion 400 is in a state in which the openings 401 (the notches 401*a* and 401*b*) are not formed.

Since the cushion 400 is formed of a hard urethane foam, the user of the pedal board (purchaser of the effector case 1) can easily process (cut) with a cutter knife or the like. Accordingly, by forming only the openings 401 required by the user according to the above use mode, the opening area can be minimized. As a result, the rigidity of the cushion 400 is secured, the effect of holding the effector E (restricting movement in the horizontal direction) is enhanced, the effect of hiding the wirings EW1 to EW4 routed along the grooves 312 by the cushion 400 can be secured, and the look (appearance) can be improved.

Next, a method of attaching the effector E when the rear case 300 and the cushion 400 are used as a pedal board will be described with reference to FIG. 2 to FIG. 5(*b*).

First, wirings EW1 to EW4 to be routed around the rear side of the cushion 400 are arranged in the grooves 312 of the rear case 300.

The wiring EW1 for power supply includes a plurality of jacks and is formed as a DC branch cable that can distribute and supply electric power to each of effectors E connected to the jacks. In this case, unused portions (cables and plugs) of the wiring EW1 branched into a plurality of wirings are arranged in the grooves 312.

Accordingly, as will be described later, by attaching the cushion 400, even if there are unused portions of branched wirings EW1 of the wiring EW1, these portions can be hidden by the cushion 400, and it is possible to prevent being pinched by the operated effector E or prevent the look from becoming undesirable.

Next, a cushion 400 having openings 401 formed in advance according to the shapes and arrangements of the effectors E to be used is placed on the attached surface 311, the effectors E are fitted into the openings 401, and the above wirings EW1 to EW4 are connected to the effectors E. Also, a remaining wiring (i.e., a wiring EW5 to be routed around the front side of the cushion 400) is connected to the effectors E to complete the connection row. Accordingly, a state in which it can be used as a pedal board is formed.

According to the pedal board (the rear case 300 and the cushion 400) configured as described above, since each attached surface 311 is a flat surface at the same height position and no level difference is generated between the attached surfaces 311, it is possible to secure a degree of freedom in the position of attaching the effector E. On the other hand, if the effectors E are attached to free positions, the wirings EW1 to EW5 would be routed in a messy state; however, in this embodiment, a part of the wirings EW1 to EW4, which particularly tend to be in a messy state, can be accommodated between the grooves 312 and the cushion 400.

Accordingly, exposure of the wirings EW1 to EW4 can be suppressed. As a result, it is possible to improve the look, and it is also possible to prevent the wirings EW1 to EW4 from being pinched by the operated effector E or prevent the wirings EW1 to EW4 from coming into contact with the operator of the effector E and changing the setting.

Herein, when it becomes necessary to route (accommodate) multiple wirings EW1 to EW4 in one groove 312, the depth dimension of the one groove 312 is insufficient, and the wirings EW1 to EW4 may overflow (popping out above the attached surface 311). In this embodiment, since the cushion 400 has elasticity, the popping portion of the wirings EW1 to EW4 can be absorbed by the elastic deformation of the cushion 400. Therefore, the wirings EW1 to EW4 can be accommodated between the grooves 312 and the cushion 400 without deteriorating the look. In this case, the elastic recovery force of the cushion 400 also has the effect of pressing and fixing the wirings EW1 to EW4.

Further, since the grooves 312 intersect with each other, the degree of freedom in routing the wirings EW1 to EW4 can be improved. In other words, even if the connection position (start terminals and end terminals of the wirings EW1 to EW4) is the same position, the routing can be changed according to the lengths of the wirings EW1 to EW4. For example, even if a wiring of an appropriate length is not prepared and a wiring that is excessively long needs to be used as the wiring EW3, with the grooves 312 intersecting with each other, it is possible to route about the wiring EW3 by using the grooves 312. Accordingly, even if the wiring EW3 is excessively long, the excessive portion can be accommodated on the rear side of the cushion 400.

In this embodiment, since the grooves 312 are intersected in a cross shape, each attached surface 311 can be a region having a substantially rectangular shape in a front view. Therefore, the area of the region for attaching the effector E can be secured, and the effector E can be stably supported. Further, with all of the grooves 312 intersecting with each other in this manner, since the lengths of the wirings EW1 to EW4 can be reduced (i.e., a shorter route can be selected as the route required for routing to the desired connection position), the area of the attached surface 311 can be increased accordingly.

Further, the grooves 312 extend in directions substantially parallel to the outer edges of the rear case 300 in a front view. In other words, the grooves 312 are formed as grooves extending in a direction along the wall parts 321 and 323 or in a direction along the wall part 322. Accordingly, the grooves 312 can be efficiently arranged in the region on the front side of the main body part 310, and it is possible to suppress formation of unnecessary regions. As a result, the areas of the attached surfaces 311 and the grooves 312 can be secured.

Further, while the effector E is attached to the attached surface 311 in an orientation substantially parallel to the outer edges (the wall parts 321 to 323) of the rear case 300 for a good look, the terminals of the wirings EW1 to EW5 (start terminals or end terminals connected to the effector E) extend in a direction orthogonal to or parallel to the outer surface of the effector E. Therefore, with the grooves 312 extending in directions substantially parallel to the outer edges of the rear case 300, it is possible to easily align the wirings EW1 to EW5 with the grooves 312 without forcibly bending them.

Herein, since the rear case 300 is formed of a resin material by hollow molding, it is difficult to secure flatness in the region (the attached surfaces 311) surrounded by the grooves 312; nonetheless, flatness can be secured in the attached surface 311 in the second region S2 since the grooves 312 are not formed. Accordingly, the effector E can be stably supported.

In particular, since the attached surface 311 in the second region S2 is formed on a side (arrow D direction side) opposite to the side formed with the jack arrangement surfaces 313 and 314, when used as a pedal board, the attached surface 311 in the second region S2 is located closer to the performer and effectors E that are frequently operated are attached thereto. Therefore, it is particularly effective to secure flatness of the attached surface 311 in the second region S2.

On the other hand, since the grooves 312 are formed between the attached surface 311 in the second region S2 and the jack arrangement surfaces 313 and 314, even when multiple effectors E are intensively attached to the attached surface 311 in the second region S2, the wirings EW3 and EW4 connecting each of these effectors E and the jack arrangement surfaces 313 and 314 can be accommodated between the grooves 312 and the cushion 400, and it is possible to prevent the look from becoming undesirable, prevent being pinched by the operated effector E, or prevent coming into contact with the operator and changing the set value.

Next, a second embodiment will be described with reference to FIG. 6 to FIG. 8. In the first embodiment described above, the grooves 312 are formed only in the first region S1, but grooves 2312 of the second embodiment are formed in an entire front surface of a main body part 2310. The same parts as those in the first embodiment will be labeled with the same reference numerals, and descriptions thereof will be omitted.

Figure 6:
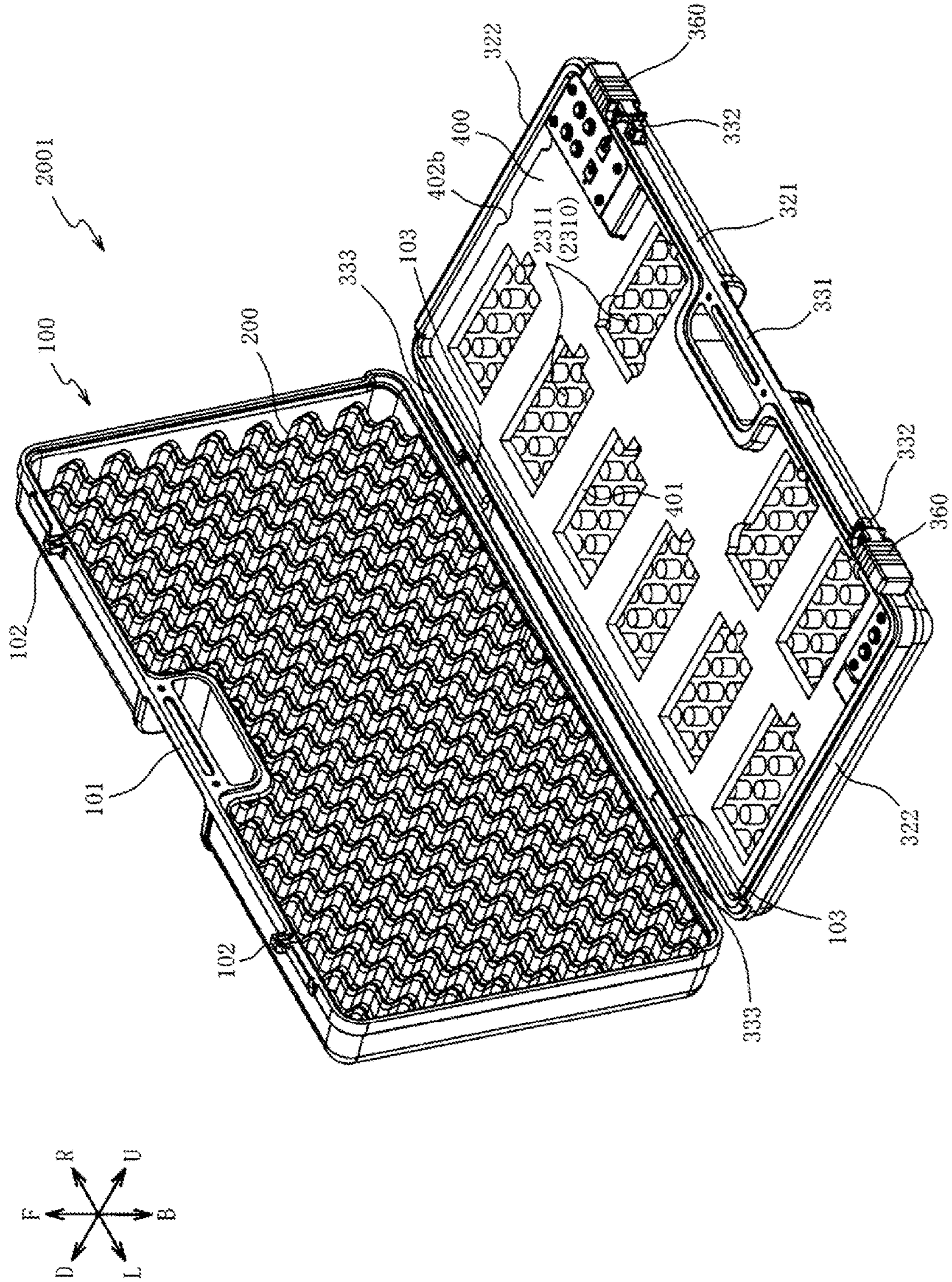
FIG. 6 is a perspective view of an effector case according to a second embodiment.
Figure 7:
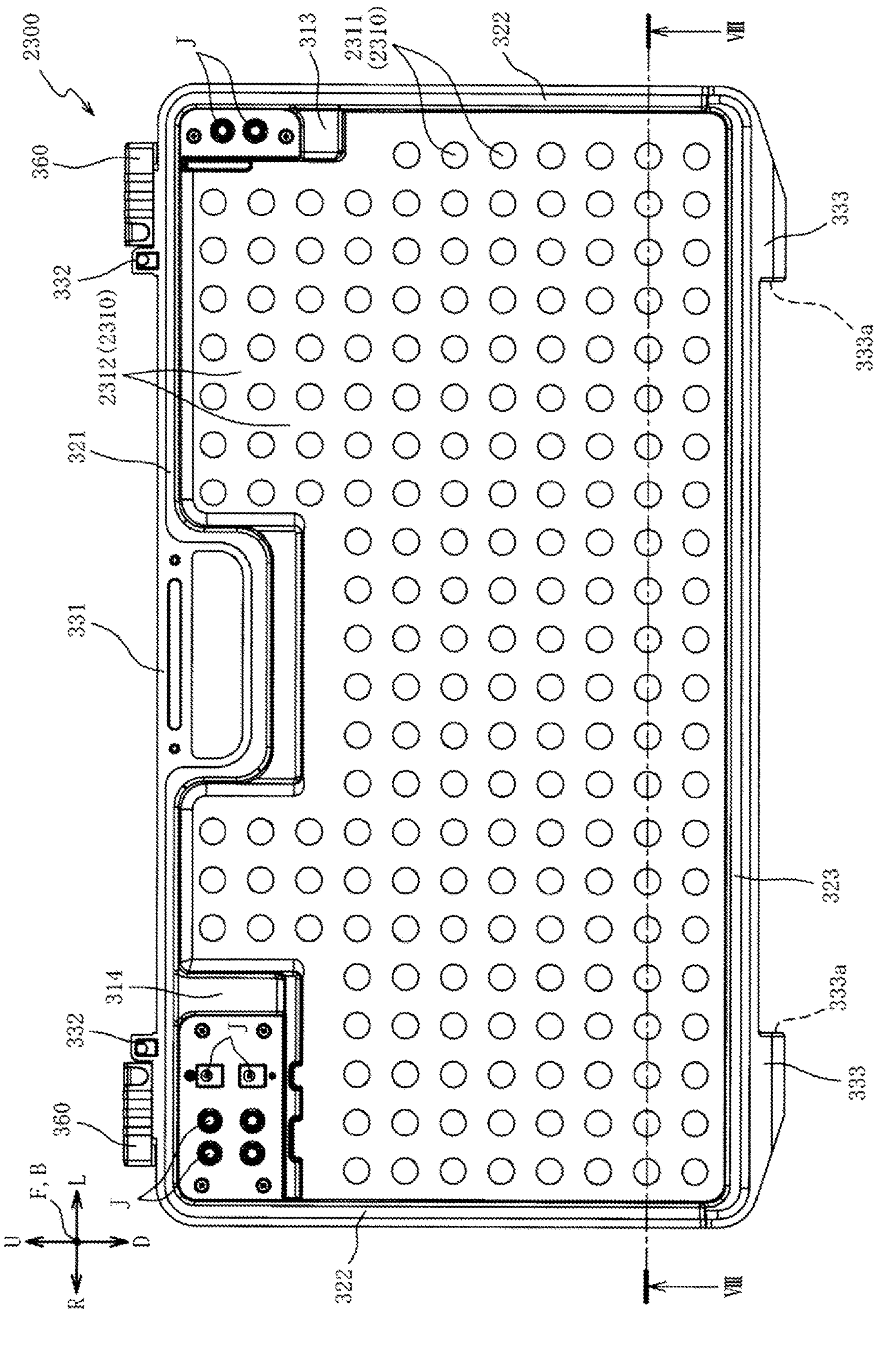
FIG. 7 is a front view of a rear case.

FIG. 6 is a perspective view of an effector case 2001 according to the second embodiment, and FIG. 7 is a front view of a rear case 2300. FIG. 8 is a partially enlarged cross-sectional view of the rear case 2300 along VIII-VIII line of FIG. 7. FIG. 6 shows the effector case 2001 in an open state.

Figure 8:
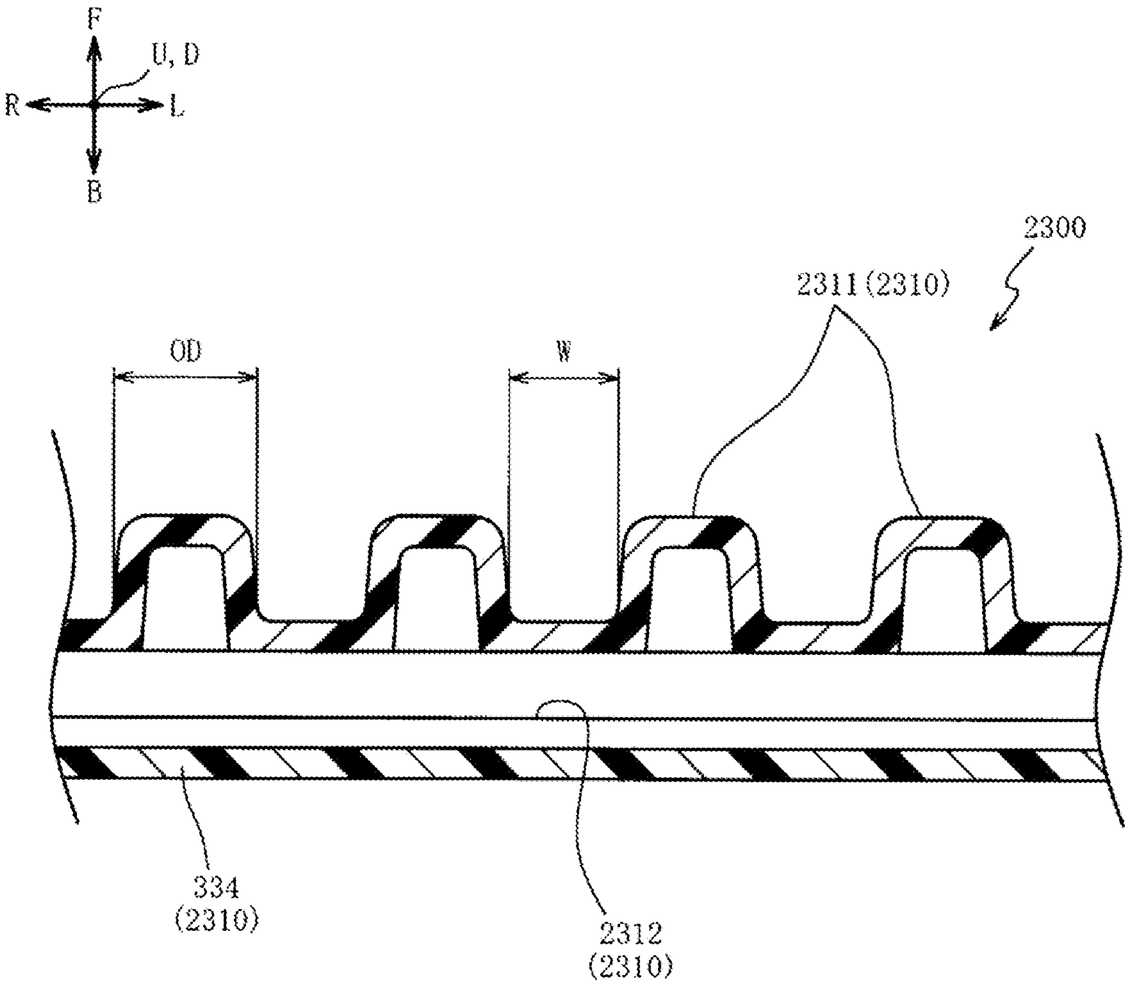
FIG. 8 is a partially enlarged cross-sectional view of the rear case along VIII-VIII line of FIG. 7.

As shown in FIG. 6 to FIG. 8, the rear case 2300 includes a main body part 2310 formed in a rectangular shape in a front view (plan view; arrow B direction view), and wall parts 321, 322, and 323 formed along four edges (outer edges) of the main body part 2310, and the rear case 2300 is formed of ABS resin by hollow molding (blow molding).

An attached surface 2311 to which an effector E is attached is formed on a front surface (a surface on a paper surface side of FIG. 7) of the main body part 2310. The attached surface 2311 is formed as a flat surface (a plane parallel to the arrow U-D direction and the arrow L-R direction) having the same height position (a position in the arrow F-B direction) as a whole.

On the attached surface 2311, grooves 2312 serving as accommodation spaces for wirings are formed to be recessed toward the rear side (arrow B direction side). Accordingly, attached surfaces 2311 surrounded by the grooves 2312 and thus partitioned as regions having a substantially circular shape in a front view are dispersed and formed over the entire region of the main body part 2310. In other words, protrusions which are formed in a substantially columnar shape by being surrounded by the grooves 2312 and have end surfaces on a tip side (arrow F direction side) forming the attached surface 2311 are dispersedly arranged on the main body part 2310.

In this embodiment, a plurality of protrusions are arranged at substantially equal intervals along the lateral direction (a direction along the wall parts 321 and 323; arrow L-R direction) and the longitudinal direction (a direction along the wall part 322; arrow U-D direction). Therefore, the grooves 2312 extend in the lateral direction and the longitudinal direction and intersect with each other in a cross shape.

Accordingly, not only can the spaces (the grooves 2312) between the protrusions be linearly routed along the longitudinal direction (arrow U-D direction) and the lateral direction (arrow L-R direction), but it is also possible to connect the spaces (the grooves 2312) between the protrusions in a zigzag manner (i.e., repeating longitudinal and lateral bendings) to route wirings in an oblique direction. As a result, the degree of freedom in routing the wirings can be improved.

Further, since the positions at which wirings can be routed (i.e., positions at which the notches 401*a* and 401*b* may be formed) from the front side of the cushion 400 to the grooves 2312 (or in an opposite direction) are expanded, the amount of wirings exposed on the front side of the cushion 400 can be reduced accordingly, and not only can the look be improved, but the degree of freedom in the attaching position (including the attaching direction) of the effector E can also be improved.

When routing a wiring along the grooves 2312, the wiring is bent along the shape of the protrusions at positions where the routing direction is changed; in this embodiment, since the protrusions are formed in a columnar shape, the radius of the bent portion of the wiring can be secured, and the burden on the wiring can be reduced.

Herein, in this embodiment, an outer diameter OD of the protrusion is set to approximately 12 mm. However, the outer diameter OD of the protrusion is not limited to approximately 12 mm, but may be further reduced as long as the flatness of the attached surface 2311 can be secured and the support for the effector E can be stabilized. This is because by reducing the outer diameter OD of the protrusion, the arrangement number (region) of the grooves 2312 can be secured, and the degree of freedom in routing the wirings or in the attaching position and orientation of the effector E can be improved.

An interval W between the protrusions may be approximately 10 mm or more and approximately 15 mm or less in the longitudinal direction (arrow U-D direction) and the lateral direction (arrow L-R direction). This is because by setting to approximately 10 mm or more, the arrangement number (region) of the grooves 2312 can be secured, and the degree of freedom in routing the wirings and the degree of freedom in the attaching position or orientation of the effector E can be improved; on the other hand, the arrangement number (region) of the protrusions (the attached surface 2311) can be secured, and the support for the effector E can be stabilized.

Further, according to the above interval W, the dimension can be the same as the thickness of a generally used commercially available wiring. Therefore, a wiring that is routed along the grooves 2312 (e.g., a wiring that is bent and routed longitudinally and laterally) can be fixed between the protrusions. Accordingly, it is possible to suppress shaking of the wirings due to vibration when carrying the effector case 2001, and it is possible to prevent the connection (jack) from being disconnected or loosened.

In particular, in this embodiment, with the rear case 2300 formed of a resin material by hollow molding, the protrusions are formed in a hollow columnar shape. For this reason, the protrusions may be deformed and dented by the wirings routed along the grooves 2312. Therefore, it is particularly effective to adopt the above interval W for fixing the wirings (preventing shaking) at the time of carrying.

In this embodiment, the interval W between the protrusions is set to approximately 12 mm in the longitudinal direction (arrow U-D direction) and the lateral direction (arrow L-R direction). On the tip side (an attached surface 2311 side) of the protrusion, the interval W is slightly increased by an amount of the draft from the mold.

As described above, by being fitted into the opening 401 of the cushion 400, the effector E is restrained by the inner surface of the opening 401, and movement in the horizontal direction (a direction parallel to the attached surface 311) is restricted. Accordingly, the effector E is held in a state of being attached to the attached surface 311. Therefore, it is not necessary to fix the effector E to the attached surface 311 with a hook-and-loop fastener or a double-sided tape. In the second embodiment, since the area of the attached surface 2311 is small, and it is difficult to secure the flatness of the attached surface 2311, a configuration that does not require fixing of the effector E with a hook-and-loop fastener or a double-sided tape is particularly effective.

Although the disclosure has been described based on the above embodiments, the disclosure is not limited to the above embodiments, and obviously various improvements and modifications can be made without departing from the gist of the disclosure.

In each of the above embodiments, it has been described that the effectors E of the same type are attached, but the disclosure is not necessarily limited thereto. Of course, it is possible to attach effectors E of different types. Of course, it is also possible to attach another device (e.g., a tuner) other than the effector E. The another device may be a device not connected to the effector E by a wiring.

In each of the above embodiments, it has been described that the front case 100 and the rear case 300 are formed into hollow products by hollow molding, but the disclosure is not necessarily limited thereto. The front case 100 and the rear case 300 may also be formed as solid products by injection molding.

In each of the above embodiments, it has been described that the effector E is attached in an orientation (an orientation in which the outer shape of the effector E is parallel to the arrow U-D direction and the arrow L-R direction in a front view) along the outer edges (the wall parts 321 to 323) of the rear cases 300 and 2300, but the disclosure is not necessarily limited thereto. A part or all of a plurality of effectors E may also be attached in an orientation inclined to the outer edges (the wall parts 321 to 323) of the rear cases 300 and 2300. In this case, the routing of the wirings would become more messy; however, according to the above embodiments, since the wirings can be accommodated between the grooves 312 and 2312 and the cushion 400, it is possible to suppress the adverse effect due to the wirings while securing the degree of freedom in the position (orientation) of attaching the effector.

In each of the above embodiments, it has been described that the grooves 312 and 2312 respectively intersect with others grooves 312 and 2312, but the disclosure is not necessarily limited thereto. A part of the grooves 312 and 2312 may have a configuration (independent groove) not intersecting with other grooves 312 and 2312. Since the wirings can also be accommodated between the independent groove and the cushion 400, it is possible to suppress the adverse effect due to the wirings while securing the degree of freedom in the position of attaching the effector.

In each of the above embodiments, it has been described that the grooves 312 and 2312 extend in the lateral direction (a direction along the wall parts 321 and 323; arrow L-R direction) and in the longitudinal direction (a direction along the wall part 322; arrow U-D direction) and intersect at an angle of approximately 90 degrees, but the disclosure is not necessarily limited thereto. One of the groove 312 and 2312 extending in the lateral direction and the groove 312 and 2312 extending in the longitudinal direction may also intersect with the other at an angle other than 90 degrees (e.g., 45 degrees). In this case, the bending angle of the wiring along the grooves 312 and 2312 can be made gentler than 90 degrees, and the wiring is less likely to be damaged.

In the first embodiment described above, it has been described that the grooves 312 are not formed in the attached surface 311 in the second region S2, but the disclosure is not necessarily limited thereto. The grooves 312 may also be formed in the attached surface 311 in the second region S2. In this case, the grooves 312 in the second region S2 may be fewer than the grooves 312 in the first region S1. In other words, the area of one attached surface 311 in the second region S2 may be larger than the area of one attached surface 311 in the first region S1. It may be decided in consideration of the arrangement of effectors E that are frequently used.

In each of the above embodiments, it has been described that by fitting and restraining in the opening 401 of the cushion 400, the effector E is held by the cushion 400, but the disclosure is not necessarily limited thereto. In addition to this, the effector E may also be fixed to the attached surface 311 with a hook-and-loop fastener or a double-sided tape.

Similarly, it has been described that the cushion 400 is restrained and held by the inner surfaces of the wall parts 321 to 323 of the rear cases 300 and 2300, but the disclosure is not necessarily limited thereto, and other means may also be adopted.

As other means, examples include a configuration in which the cushion 400 is fixed to the attached surface 311 by a hook-and-loop fastener or a double-sided tape, a configuration in which protrusions protruding from the rear surface of the cushion 400 are fitted and held in the grooves 312 and 2312, and a configuration in which protrusions protruding from the attached surface 311 are fitted and held in recesses formed on the rear surface of the cushion 400.

When these configurations (other means) are adopted, the wall parts 321 to 323 may be omitted from the rear cases 300 and 2300. When the wall parts 321 to 323 are omitted, the engaged part 332 and the receiving part 333 are formed on the outer surface of the main body parts 310 and 2310.

In each of the above embodiments, it has been described that the wiring EW5 is arranged on the front surface of the cushion 400, but the disclosure is not necessarily limited thereto. An opening may be provided in the cushion 400, and a part of the wiring EW5 may be accommodated between the grooves 312 and 2312 and the cushion 400 through this opening.

In each of the above embodiments, it has been described that the notches 401*a* and 401*b* are formed in the opening 401 of the cushion 400, but the disclosure is not necessarily limited thereto. The notches 401*a* and 401*b* may also be omitted. Even in this case, by elastically deforming the cushion 400, the wirings EW2 and EW3 can be passed between the inner edge of the opening 401 and the outer surface of the effector E. The same applies to the notches 402*a* to 402*c*.

In each of the above embodiments, it has been described that when the rear case 300 is placed on the floor (flat surface) (when the support part 335 is grounded to the floor), the attached surfaces 311 and 2311 are substantially parallel to the floor, but the disclosure is not necessarily limited thereto. The attached surfaces 311 and 2311 may also be formed to be inclined with respect to the floor. In this case, the attached surfaces 311 and 2311 may be inclined downward from the wall part 321 side to the wall part 323 side.

In the above second embodiment, it has been described that the protrusions formed by being surrounded by the grooves 2312 have a substantially columnar shape, but the disclosure is not necessarily limited thereto. The protrusions may also have another shape. Examples of the another shape include a substantially conical shape, a substantially truncated cone shape, a hemispherical shape, a thin rod shape (needle shape), and the like. In the case of a substantially conical shape, a substantially truncated cone shape, or a hemispherical shape, by setting an outer diameter on a bottom side (arrow B direction side) of the cone, the truncated cone, or the hemisphere and their interval to the same dimensions as the outer diameter OD and the interval W (see FIG. 8) in the second embodiment, larger spaces for the grooves 2312 can be secured to facilitate accommodation of the wirings. Further, in the case of a thin rod shape (needle shape), by setting an interval on the bottom side thereof to the interval W, spaces of the grooves 2312 can be secured to accommodate the wirings.

In the second embodiment, it has been described that the protrusions formed by being surrounded by the grooves 2312 are linearly arranged at substantially equal intervals along the lateral direction and the longitudinal direction, but the disclosure is not necessarily limited thereto. One or both of the rows of protrusions along the lateral direction and the longitudinal direction may also be arranged in a zigzag manner (staggered arrangement). In this case, a wiring that is routed along the lateral direction or the longitudinal direction can be bent by the protrusions and easily fixed to the grooves 2312. As a result, it is possible to suppress shaking of the wirings due to vibration when carrying the effector case 2001.

In the above second embodiment, the support columns 311*a* and 312*a* may be formed on one or both of the attached surface 2311 and the groove 2312. Accordingly, as in the first embodiment, with the support columns 311*a* and 312*a* functioning as support columns, it is possible to prevent the attached surface 2311 from bending toward the rear side, and it is possible to improve the operability of the effector E.

The configurations of the above embodiments and the configurations of the modification examples may be combined. For example, in the first region S1 of the first embodiment, the attached surface 2311 and the groove 2312 of the second embodiment may be formed in place of the attached surface 311 and the groove 312. In this case, in the region to which frequently operated effectors E are attached, flatness is secured and the effectors E can be stably supported, and in the region with much routing of wirings, it is possible to secure spaces for accommodating the wirings.

What is claimed is:

1. A pedal board comprising:

an attached member comprising an attached surface on which an effect device is arranged, and at least one accommodation part formed on the attached surface as a recess capable of accommodating a wiring connected to the effect device; and a plate having elasticity, formed with an opening and placed on an attached surface side of the attached member, wherein the effect device is fittable into the opening, wherein the at least one accommodation part comprises a plurality of accommodation parts formed to extend in a groove shape, and at least a part of the plurality of accommodation parts intersects with each other.

2. The pedal board according to claim 1, wherein the at least a part of the plurality of accommodation parts intersects with each other in a cross shape.

3. The pedal board according to claim 2, wherein the accommodation parts intersecting in the cross shape are substantially parallel to outer edges of the attached member in a plan view.

4. A pedal board comprising:

an attached member comprising an attached surface on which an effect device is arranged, and at least one accommodation part formed on the attached surface as a recess capable of accommodating a wiring connected to the effect device; and a plate having elasticity, formed with an opening and placed on an attached surface side of the attached member, wherein the effect device is fittable into the opening, wherein a plurality of protrusions formed by being surrounded by the at least one accommodation part and having a tip side forming the attached surface are dispersedly arranged on the attached member.

5. The pedal board according to claim 4, wherein the protrusion is formed in a substantially columnar shape.

6. The pedal board according to claim 5, wherein an interval between the protrusions in a left-right direction and an up-down direction is approximately 10 mm or more and approximately 15 mm or less.

7. The pedal board according to claim 1, wherein the attached member comprises a wall part formed along an outer edge, and at least a part of an outer edge of the plate is in contact with an inner surface of the wall part.

8. The pedal board according to claim 1, wherein the attached surface is divided into a plurality of attached surfaces by the at least one accommodation part, and the attached surfaces are formed at a substantially same height position.

9. The pedal board according to claim 1, wherein the attached member is formed of a resin material by hollow molding.

10. A method of attaching an effector to a pedal board, comprising:

providing an attached member which is a main body part of a case, the attached member comprising an attached surface which is at least one region having a substantially same height, and at least one accommodation part having a height less than a height of the attached surface;

placing a plate having elasticity on the attached surface of the attached member, wherein the plate is formed with an opening;

routing a wiring to be connected to the effector around a rear side of the plate and arranging the wiring in the accommodation part of the attached member; and fitting the effector into the opening and connecting the wiring to the effector.

11. The method according to claim 10, wherein the at least one accommodation part comprises a plurality of accommodation parts formed to extend in a groove shape, and at least a part of the plurality of accommodation parts intersects with each other.

12. The method according to claim 11, wherein the at least a part of the plurality of accommodation parts intersects with each other in a cross shape.

13. The method according to claim 12, wherein the accommodation parts intersecting in the cross shape are substantially parallel to outer edges of the attached member in a plan view.

14. The method according to claim 10, wherein a plurality of protrusions formed by being surrounded by the at least one accommodation part and having a tip side forming the attached surface are dispersedly arranged on the attached member.

15. The method according to claim 14, wherein the protrusion is formed in a substantially columnar shape.

16. The method according to claim 10, wherein the attached member comprises a wall part formed along an outer edge, and at least a part of an outer edge of the plate is in contact with an inner surface of the wall part.

17. A pedal board comprising:

an attached member comprising an attached surface on which an effector is arranged, and at least one accommodation part formed on the attached surface as a recess capable of accommodating a wiring connected to the effector; and a plate having elasticity, formed with an opening and placed on an attached surface side of the attached member, wherein the effector is fittable into the opening, wherein the attached member comprises a wall part formed along an outer edge, an outer edge of the plate is in contact with an inner surface of the wall part, and the attached surface is divided into a plurality of attached surfaces by the at least one accommodation part, and the attached surfaces are formed at a substantially same height position.

18. The pedal board according to claim 17, wherein with the outer edge of the plate being in contact with the inner surface of the wall part, one of the plurality of attached surfaces is formed at a position of the opening formed at the plate.

19. The pedal board according to claim 17, wherein the attached member further comprises a jack arrangement surface higher than the attached surface at a corner part of the wall part.

* * * * *